United States Patent
Hatahori et al.

(10) Patent No.: US 12,111,266 B2
(45) Date of Patent: Oct. 8, 2024

(54) VIBRATION MEASUREMENT DEVICE

(71) Applicant: Shimadzu Corporation, Kyoto (JP)

(72) Inventors: Takahide Hatahori, Kyoto (JP); Yuya Nagata, Kyoto (JP); Kenji Takubo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1003 days.

(21) Appl. No.: 17/044,571

(22) PCT Filed: Dec. 13, 2018

(86) PCT No.: PCT/JP2018/045902
§ 371 (c)(1),
(2) Date: Oct. 1, 2020

(87) PCT Pub. No.: WO2019/193788
PCT Pub. Date: Oct. 10, 2019

(65) Prior Publication Data
US 2021/0096085 A1    Apr. 1, 2021

(30) Foreign Application Priority Data
Apr. 5, 2018    (JP) .................................. 2018-073165

(51) Int. Cl.
G01N 21/88     (2006.01)
G01B 9/02      (2022.01)
G01N 29/24     (2006.01)

(52) U.S. Cl.
CPC ..... *G01N 21/8806* (2013.01); *G01B 9/02094* (2013.01); *G01N 29/2418* (2013.01);
(Continued)

(58) Field of Classification Search
CPC .......... G01N 21/8806; G01N 29/2418; G01N 2021/8838; G01N 2201/06113;
(Continued)

(56) References Cited

U.S. PATENT DOCUMENTS 4,352,565 A * 10/1982 Rowe ................. G01B 9/02094
                                                    385/29
4,913,547 A *  4/1990 Moran ............... G01B 9/02067
                                                    73/656
(Continued)

FOREIGN PATENT DOCUMENTS

CN    107462581 A    12/2017
JP    H01-127911 A    5/1989
(Continued)

OTHER PUBLICATIONS

Decision of Refusal dated Mar. 17, 2023 issued for the corresponding Chinese Patent Application No. 201880092070.0.
(Continued)

*Primary Examiner* — Isiaka O Akanbi
(74) *Attorney, Agent, or Firm* — Muir Patent Law, PLLC

(57)    ABSTRACT

A vibration measurement device 10 includes an excitation unit (signal generator 11 and vibrator 12) for exciting an elastic wave to an inspection target S, an illumination unit (wavelength stabilized laser beam source 13 and illumination light lens 14) for performing stroboscopic illumination to a measurement region of a surface of the inspection target S using a wavelength stabilized laser beam source 13, a displacement measurement unit (speckle-sharing interferometer 15) for collectively measuring a displacement of each point of the measurement region in the back-and-forth direction by speckle interferometry or speckle-sharing interferometer. By using the wavelength stabilized laser beam
(Continued)

source 13, an interference image can be obtained even when the inspection target S has large surface irregularities.

2 Claims, 3 Drawing Sheets

(52) U.S. Cl.
CPC ............ *G01N 2021/8838* (2013.01); *G01N 2201/06113* (2013.01); *G01N 2201/0635* (2013.01)

(58) Field of Classification Search
CPC ... G01N 2201/0635; G01N 2291/0232; G01N 2291/0234; G01B 9/02094; G01B 9/02001; G01B 9/02014; G01B 9/02067; G01B 9/02095; G01B 9/02098; G01M 5/0033; G01M 5/005; G01M 5/0066; G01M 5/0091; G01H 9/002
USPC .................. 356/493, 432, 502, 426; 73/657
See application file for complete search history.

(56) References Cited

U.S. PATENT DOCUMENTS

| | | | |
|---|---|---|---|
| 5,402,233 A * | 3/1995 | Schultz | G10K 15/046 356/432 |
| 5,604,592 A * | 2/1997 | Kotidis | G01N 29/2456 374/119 |
| 5,691,989 A | 11/1997 | Rakuljic et al. | |
| 6,057,927 A * | 5/2000 | Levesque | G01K 17/02 356/451 |
| 6,175,411 B1 * | 1/2001 | Telschow | G01H 9/00 356/503 |
| 9,839,365 B1 | 12/2017 | Homyk et al. | |
| 10,299,682 B1 * | 5/2019 | Yang | A61B 5/14553 |
| 2010/0033733 A1 * | 2/2010 | Yeh | G01B 9/02007 356/511 |
| 2017/0350690 A1 * | 12/2017 | Hatahori | G01B 9/02096 |
| 2018/0283847 A1 * | 10/2018 | Hatahori | G01N 29/043 |
| 2018/0356205 A1 * | 12/2018 | Hatahori | G01B 9/02095 |
| 2019/0339117 A1 * | 11/2019 | Nussinson | G01H 9/00 |

FOREIGN PATENT DOCUMENTS

| | | |
|---|---|---|
| JP | 2004-101189 A | 4/2004 |
| JP | 2009-081321 A | 4/2009 |
| JP | 2014063933 A | 4/2014 |
| JP | 2017-219318 A | 12/2017 |

OTHER PUBLICATIONS

Nakajima, "Vibration Analysis by Holography", pp. 560-573, Apr. 25, 1972, submitted with a machine translation.
Written Opinion of the International Searching Authority (ISA237) for PCT application PCT/JP2018/045902, dated Feb. 19, 2019, submitted with a machine translation.
Second Office Action dated Sep. 28, 2022 for corresponding Chinese Patent Application No. CN 201880092070.0.
Second Office Action dated Mar. 29, 2022 issued for corresponding Japanese Application No. 2020-511594.
First Office Action dated Dec. 20, 2021 for corresponding Chinese Application No. CN 201880092070.0, submitted with a machine translation.

\* cited by examiner

VIBRATION MEASUREMENT DEVICE

TECHNICAL FIELD

The present invention relates to a vibration measurement device capable of being used for detecting defects of an object, such as, e.g., a concrete structure and a steel structure.

BACKGROUND OF THE INVENTION

A laser ultrasonic method is one of the techniques to detect defects on a surface and an inside of an object, such as, e.g., a concrete structure and a steel structure. In this method, vibrations of elastic waves are excited to an inspection target. In this state, a laser beam is irradiated to the inspection target. The reflected light is detected by a laser interferometer to measure the surface displacement. Since the displacement due to vibrations changes discontinuously at the location of a defect, the defect can be detected by measuring the distribution of the displacement. However, in this method, since the detection laser (probe laser) of the laser interferometer is in a dot-shape, it is necessary to scan over the entire inspection region of the inspection target, causing a problem that it takes time.

As an improved technique, a defect detection device using speckle interferometry or speckle-sharing interferometer has been proposed. In the speckle interferometry, the laser beam from the laser beam source is branched into illumination light and reference light, and stroboscopic illumination to the inspection region is performed using the illumination light. Then, the interference pattern by the light which is the illumination light reflected at each point on the surface of the inspection target in the inspection region and the reference light is obtained. In the speckle-sharing interferometer, stroboscopic illumination to the inspection region is performed using a laser beam from a laser beam source (reference light is not branched) to obtain the interference pattern due to the light reflected from two points close to the surface of the inspection target in the inspection region. In these defect detection devices, elastic waves are input from the excitation source to the inspection target. And, the image of the interference pattern is captured with a CCD camera or the like before and after the input. Then, the displacement or the distribution of the relative displacement of the inspection region in the back-and-forth direction (out-of-plane direction) is calculated from those two images. Since the displacement or the relative displacement at the location of the defect becomes discontinuous, it is possible to detect the defect present in the inspection region. In these methods, however, only one state of the elastic wave is observed. Therefore, when the wavelength of the elastic wave is smaller than the inspection region, it is easy to detect the defect if the defect happens to be in a portion where the amplitude of the wave is large. However, the detection becomes difficult when the defect is present in a portion where the amplitude is small. That is, the defect inspection capability differs depending on the location in the inspection region.

On the other hand, Patent Document 1 describes a defect detection device using speckle interferometry or speckle-sharing interferometer. In the detect detection device, while exciting a continuous wave of an elastic wave from an excitation source to an inspection target, the image of the interference pattern is captured by performing stroboscopic illumination from a pulsed laser beam source at each of at least three different phases of the continuous wave, and the displacement at each point (speckle interferometry) or the relative displacement between two adjacent points (speckle-sharing interferometer) is measured. With this, regardless of the relationship between the size of the inspection region and the wavelength of the elastic wave, the full vibration state of the elastic wave can be reproduced at any position in the inspection region, and defects can be accurately detected regardless of the position in the inspection region.

PRIOR ART DOCUMENT

Patent Document

Patent Document 1: Japanese Unexamined Patent Application Publication No. 2017-219318
Patent Document 2: U.S. Pat. No. 5,691,989 Specification
Patent Document 3: Japanese Unexamined Patent Application Publication No 2009-081321

SUMMARY OF THE INVENTION

Problems to be Solved by the Invention

In the defect detection device described in Patent Document 1, it is necessary to perform stroboscopic illumination synchronized with the phase of the excitation elastic wave. As a method for controlling the timing of the stroboscopic illumination, there are a direct modulation method for controlling the driving current of the laser and an external modulation method in which a continuous wave laser and a modulator are combined. Although the external modulation method can be applied regardless of the laser type, the direct modulation method is preferable in the viewpoint of device miniaturization. In particular, the direct modulation method using a semiconductor laser also has the advantage of low cost. However, in cases where a general semiconductor laser is used, an event may occur in which the interference image cannot be obtained when the surface of the inspection region has large irregularities.

So far, the defect detection has been described as an example. However, other than the case of detecting defects, for example, as in the internal structure analysis of an object, the same problem occurs when measuring the vibration due to the elastic wave excited to the inspection target using speckle interferometry or speckle-sharing interferometer.

An object of the present invention solving the problems is to provide a vibration measurement device capable of obtaining an interference image more assuredly to measure vibrations even when inspecting an inspection target having large surface irregularities using a semiconductor laser.

Means for Solving the Problem

A vibration measurement device according to the present invention made to solve the above-described problems, includes:
an excitation unit configured to excite an elastic wave to an inspection target;
an illumination unit configured to perform stroboscopic illumination to a measurement region of a surface of the inspection target using a wavelength stabilized laser beam source; and
a displacement measurement unit configured to collectively measure a displacement of each point of the measurement region in a back-and-forth direction by speckle interferometry or speckle-sharing interferometer.

In a semiconductor laser, when the driving current is modulated, since the oscillation wavelength changes due to the temperature change or the like of the element caused during lighting, the coherence length is effectively shortened. In order to acquire an interference image, in the speckle interferometry, the optical path difference between the illumination light and the reference light needs to be shorter than the coherence length over the entire measurement region. In the speckle-sharing interferometer, the optical path difference between the light reflected from the two points close to each other on the surface of the inspection target in the measurement region (corresponding to the inspection region in the above-described defect inspection) needs to be shorter than the coherence length over the entire measurement region. However, in cases where the surface of the inspection target has irregularities or the inspection target is inclined, the optical path difference becomes longer than the coherence length in a part of the measurement region. As a result, an interference image cannot be obtained in the entire measurement region.

Therefore, in the vibration measurement device according to the present invention, by using the wavelength stabilized laser beam source as the beam source of the illumination unit, it is possible to prevent the change of the oscillation wavelength during lighting, thereby preventing shortening of the coherence length. Thus, since it is possible to obtain an interference image over the entire measurement region, the displacement measurement unit can perform an accurate batch measurement of displacement of each point in the back-and-forth direction in the measurement region.

Various wavelength stabilized laser beam sources can be used. For example, it is possible to use a wavelength stabilized laser beam source that repeats the operation in which an oscillation laser beam generated by a semiconductor laser is introduced to a grating provided outside the semiconductor laser (where less susceptible to temperature changes), the light of a wavelength band narrower than the wavelength band of the oscillation laser beam from the semiconductor laser is selectively returned (feedbacked) to the semiconductor laser by the grating (e.g., see Patent Document 2). Alternatively, it is possible to use a wavelength stabilized laser beam source equipped with a mechanism for controlling the temperature of the semiconductor laser and a mechanism for detecting the wavelength of the oscillation laser beam generated by the semiconductor laser and configured to control the temperature of the semiconductor laser in accordance with the deviation of the wavelength of the oscillation laser beam from a predetermined wavelength (e.g., see Patent Document 3).

When there is any defect in the measurement region of the inspection target, the displacement of each point in the back-and-forth direction in the region changes discontinuously at the location of the defect. Therefore, it is possible to detect defects in the measurement region by measuring the displacement of each point in the back-and-forth direction in the measurement region using the vibration measurement device according to the present invention.

As a method of determining the phase of the interference light in the speckle-sharing interferometer, a phase shift method of changing the phase of the light from two points to at least three different states can be used. Specifically, the light from one of the two points is passed through the phase shifter to change the shift amount by the phase shifter to at least three different values. It is needless to say that the light from two points may be passed through a phase shifter to relatively change both the phases. Thus, in the entire measurement region, the relative displacement between the two adjacent points is measured in at least three mutually different phases of the elastic wave.

In the speckle-sharing interferometer, the displacement measurement unit controls a phase of the elastic wave and timing of the stroboscopic illumination in the speckle-sharing interferometer to collectively measure the displacement of each point in the measurement region in the back-and-forth direction in at least three mutually different phases of the elastic wave.

In the case of using the speckle-sharing interferometer, the displacement measurement unit preferably detects $n^{th}$ harmonic components of the elastic wave from the displacement of each point in the measuring area in the back-and-forth direction, wherein the number of phase states in the at least three phases is equal to or greater than (2n+1), and the number n is a natural number equal to or greater than 2. In cases where a minute defect exists in the inspection target, discontinuous changes occurred at the location may include a large number of harmonic components, and thus the detection sensitivity for minute defects can be enhanced by detecting harmonic components in this manner.

Effects of the Invention

According to the present invention, even in the case of inspecting an inspection target having large surface irregularities using a semiconductor laser, it is possible to obtain an interference image more assuredly, so that it is possible to perform a vibration measurement.

EMBODIMENTS FOR CARRYING OUT THE INVENTION

Figure 1:
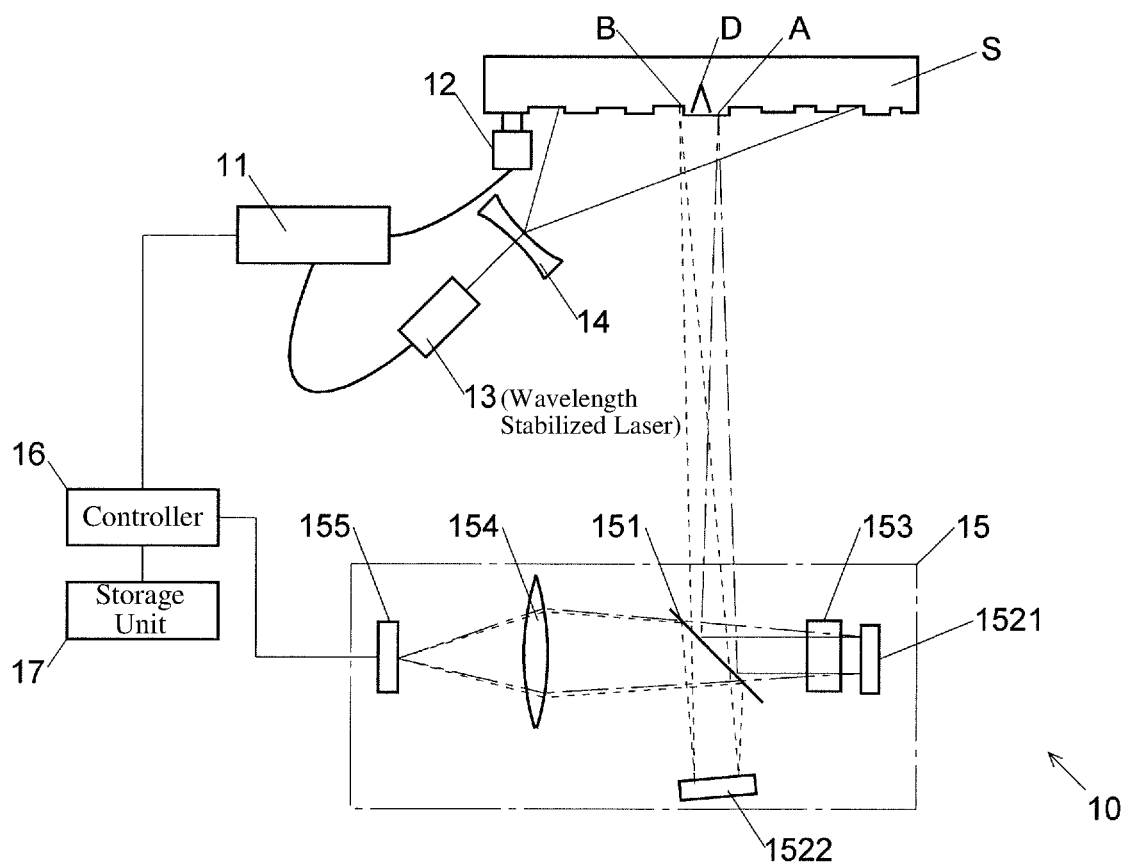
FIG. 1 is a schematic configuration diagram showing an embodiment of a vibration measurement device according to the present invention.
Figure 2:
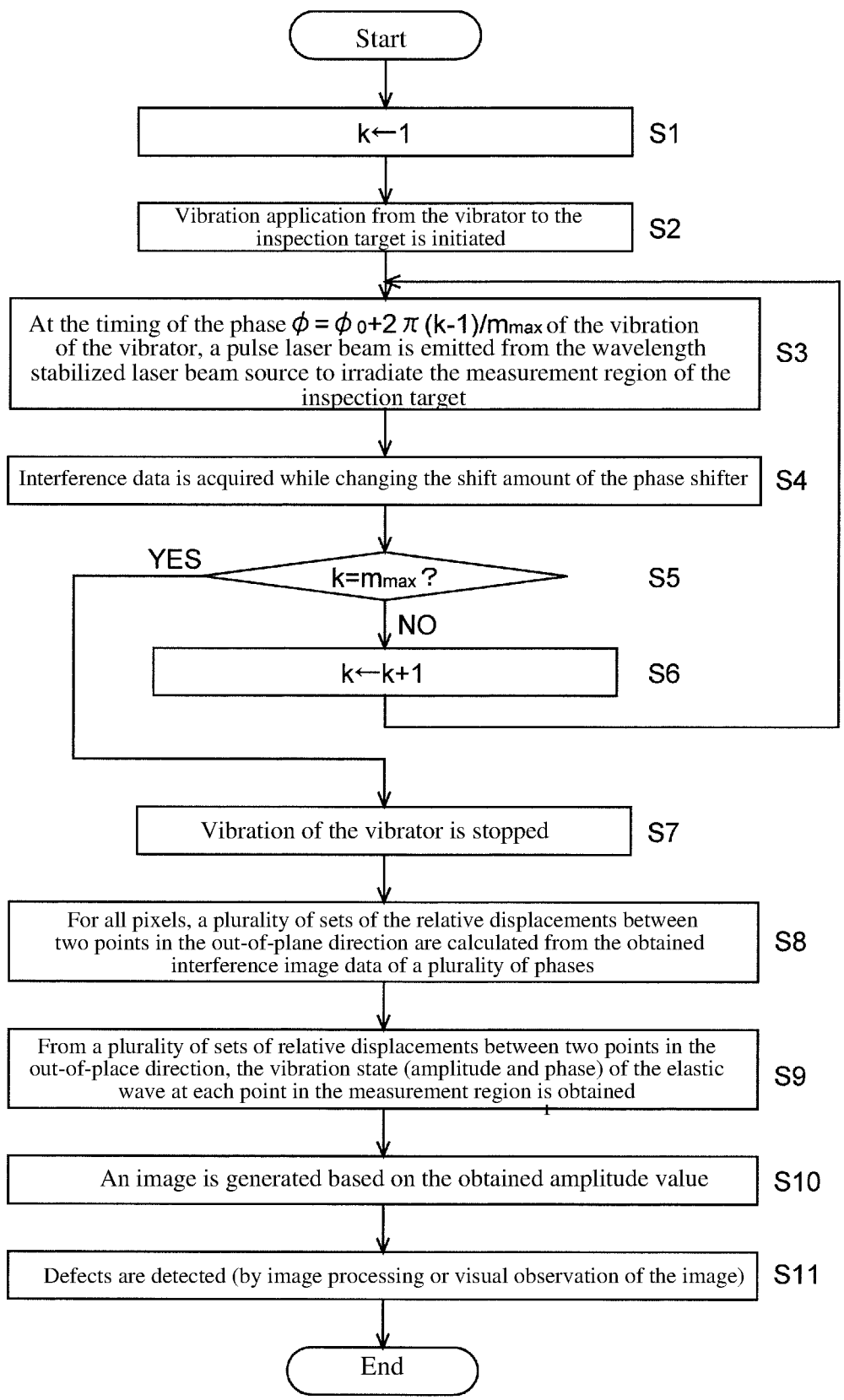
FIG. 2 is a flowchart showing an exemplary method of detecting defects using the vibration measurement device of this embodiment.

An embodiment of a vibration measurement device according to the present invention will be described with reference to FIG. 1 to FIG. 3.

The vibration measurement device 10 of this embodiment functions as a defect detection device for detecting a defect D (see FIG. 1) present on a surface of an inspection target S. As shown in FIG. 1, the vibration measurement device 10 is provided with a signal generator 11, a vibrator 12, a wavelength stabilized laser beam source 13, an illumination light lens 14, a speckle-sharing interferometer 15, a controller 16, and a storage unit 17.

The signal generator 11 is connected to the vibrator 12 by a cable. The signal generator 11 generates an alternating electrical signal and transmits the signal to the vibrator 12. The vibrator 12 is used so as to be brought into contact with the inspection target S. The vibrator 12 receives an alternating electrical signal from the signal generator 11, converts it into mechanical vibrations, and applies the mechanical vibrations to the inspection target S. As a result, an elastic wave is excited to the inspection target S. The signal generator 11 and the vibrator 12 correspond to the above-described excitation unit.

The signal generator 11 is also connected to the wavelength stabilized laser beam source 13 by a cable separate from the cable connected to the vibrator 12. The signal generator 11 transmits a pulsed electrical signal (pulse signal) to the wavelength stabilized laser beam source 13 at a timing at which the alternating electrical signal becomes a predetermined phase.

In this embodiment, as described above, the wavelength stabilized laser beam source 13 for emitting a laser beam at a stable oscillation wavelength by performing feedback is used. In the feedback, the light of a wavelength band obtained by narrowing the oscillation laser beam generated by the semiconductor laser than the wavelength band of the oscillation laser beam is selectively returned to the semiconductor laser by a grating provided outside the semiconductor laser. In particular, by using a volume holographic grating (VHG) produced by transferring an optical interference pattern to a medium, such as, e.g., a silica glass and a silicate glass, as the grating, it is possible to acquire high-wavelength stability and high-coherence (coherence length is 1 meter or more).

The illumination light lens 14 is arranged between the wavelength stabilized laser beam source 13 and the inspection target S and is composed of a concave lens. The illumination light lens 14 has a role of expanding the pulsed laser beam from the wavelength stabilized laser beam source 13 over the entire measurement region of the surface of the inspection target S. The wavelength stabilized laser beam source 13 and the illumination light lens 14 are for performing stroboscopic illumination to the measurement region of the surface of the inspection target S. They correspond to the illumination unit described above.

The speckle-sharing interferometer 15 corresponds to the above-described displacement measurement unit. It includes a beam splitter 151, a first reflecting mirror 1521, a second reflecting mirror 1522, a phase shifter 153, a condenser lens 154, and an image sensor 155. The beam splitter 151 is a half mirror arranged at a position where the illumination light reflected at the measurement region on the surface of the inspection target S is incident. The first reflecting mirror 1521 is arranged on the optical path of the illumination light reflected by the beam splitter 151, and the second reflecting mirror 1522 is arranged on the optical path of the illumination light transmitted through the beam splitter 151. The phase shifter 153 is arranged between the beam splitter 151 and the first reflecting mirror 1521 to change (shift) the phase of the light passing through the phase shifter 153. The image sensor 155 is arranged on the optical path of the illumination light reflected by the first reflecting mirror 1521 after being reflected by the beam splitter 151 and transmitted through the beam splitter 151, and the illumination light reflected by the second reflecting mirror 1522 after being transmitted through the beam splitter 151 and reflected by the beam splitter 151. The condenser lens 154 is arranged between the beam splitter 151 and the image sensor 155.

The first reflecting mirror 1521 is arranged so that its reflecting surface is at an angle of 45° with respect to the reflecting surface of the beam splitter 151. In contrast, the second reflecting mirror 1522 is arranged so that its reflecting surface is at an angle slightly inclined from 45° with respect to the reflecting surface of the beam splitter 151. The image sensor 155 has a number of detecting elements and detects the light incident on the image sensor 155 through the first reflecting mirror 1521 and the phase shifter 153 from a number of points on the surface of the inspection target S by respectively different detecting elements.

The first reflecting mirror 1521 and the second reflecting mirror 1522 are arranged as described above. Therefore, in the image sensor 155, the illumination light reflected by the point A on the surface of the inspection target S and the first reflecting mirror 1521 (see the dashed line in FIG. 1), and the illumination light reflected by the point B slightly deviated from the point A on the surface and the second reflecting mirror 1522 (see the dashed line in FIG. 1) are incident on the same position of the image sensor 155 and interfere to each other. Here, as shown in FIG. 1, when irregularities exist on the surface of the inspection target S, at a part of the surface, the optical path difference between the illumination light reflected at a point and the illumination light reflected at the adjacent point becomes long. Then, when using a normal semiconductor laser as a beam source of the illumination light, the coherence length becomes shorter than the optical path difference, so there is a possibility that these two illumination light does not interfere. However, in this embodiment, the wavelength stabilized laser beam source 13 is used to prevent the shortening of the coherence length, which makes it possible to interfere with these two illumination light.

The controller 16 controls the signal generator 11 and performs data processing based on the detection signal obtained from each detecting element of the image sensor 155. The storage unit 17 stores a detection signal obtained from each detecting element of the image sensor 155 and the data processed by the controller 16.

Hereinafter, referring to the flowchart of FIG. 2 and the graphs of FIG. 3, an example of a method for detecting a defect D present on the surface of the inspection target S using the vibration measurement device 10 according to the present invention will be described.

In this case, the surface displacement is measured $m_{max} \geq 3$ times in which the phase of the vibration of the vibrator 12 differs. The "phase of vibration of the vibrator 12" is the phase of the alternating electrical signal transmitted from the signal generator 11 to the vibrator 12, and corresponds to the phase of the elastic wave excited to the inspection target S at the point where the vibrator 12 is in contact. In the following, each measurement of the surface displacement is represented as "$k^{th}$ measurement" using the numerical value k (any natural number between 1 and $m_{max}$). In the following explanation, first, all Steps will be described as the simplest example when $m_{max}=3$, and then the case when $m_{max}$ is a larger number will be described.

First, the initial value of k is set to 1 (Step S1), an alternating electrical signal is transmitted from the signal generator 11 to the vibrator 12 to initiate the application of vibration from the vibrator 12 to the inspection target S (Step S2). As a result, the elastic wave is excited in the inspection target S.

Next, the signal generator 11 transmits a pulse signal to the wavelength stabilized laser beam source 13 at each timing at which the phase of the vibration of the vibrator 12 is represented by $[\varphi_0 + 2\pi(k-1)/m_{max}]$ using a predetermined initial value $\varphi_0$ (e.g., $\varphi_0 = 0$). Since k=1 at this stage, the phase of the vibration of the vibrator 12 when the pulsed signal is transmitted is $\varphi_0$. The wavelength stabilized laser beam source 13 repeatedly emits illumination light which is a pulsed laser beam at a stable wavelength by feedback using the grating described above at each time when receiving a pulse signal. The diameter of the illumination light is enlarged by the illumination light lens 14, and the entire measurement region on the surface of the inspection target S is irradiated with the illumination light (Step S3).

The illumination light is reflected on the surface of the inspection target S and incident on the beam splitter 151 of the speckle-sharing interferometer 15. A portion of the illumination light is reflected by the beam splitter 151 and reflected by the first reflecting mirror 1521 after passing through the phase shifter 153. A portion of the illumination light passes through the beam splitter 151 after passing through the phase shifter 153 again, and incident on the image sensor 155. The remainder of the illumination light incident on the beam splitter 151 is transmitted through the beam splitter 151 and reflected by the second reflecting mirror 1522. A portion thereof is reflected by the beam splitter 151 and incident on the image sensor 155. As described above, in the image sensor 155, the illumination light reflected at a number of points on the surface of the inspection target S is detected by different detecting elements.

The phase shifter 153 changes (shifts) the phase of the illumination light (i.e., the illumination light reflected at the point A) passing through the phase shifter 153 while the illumination light, which is a pulsed laser beam, is repeatedly output. Thus, the phase difference between the illumination light reflected at the point A and the illumination light reflected at the point B varies. During this change, each detecting element of the image sensor 155 detects the intensity of the interference light in which these two illumination light interferes (Step S4). At this time, as described above, even if the surface of the inspection target S has irregularities, the use of the wavelength stabilized laser beam source 13 prevents the shortening of the coherence length, thereby allowing the interference of the two illumination light.

Figure 3:
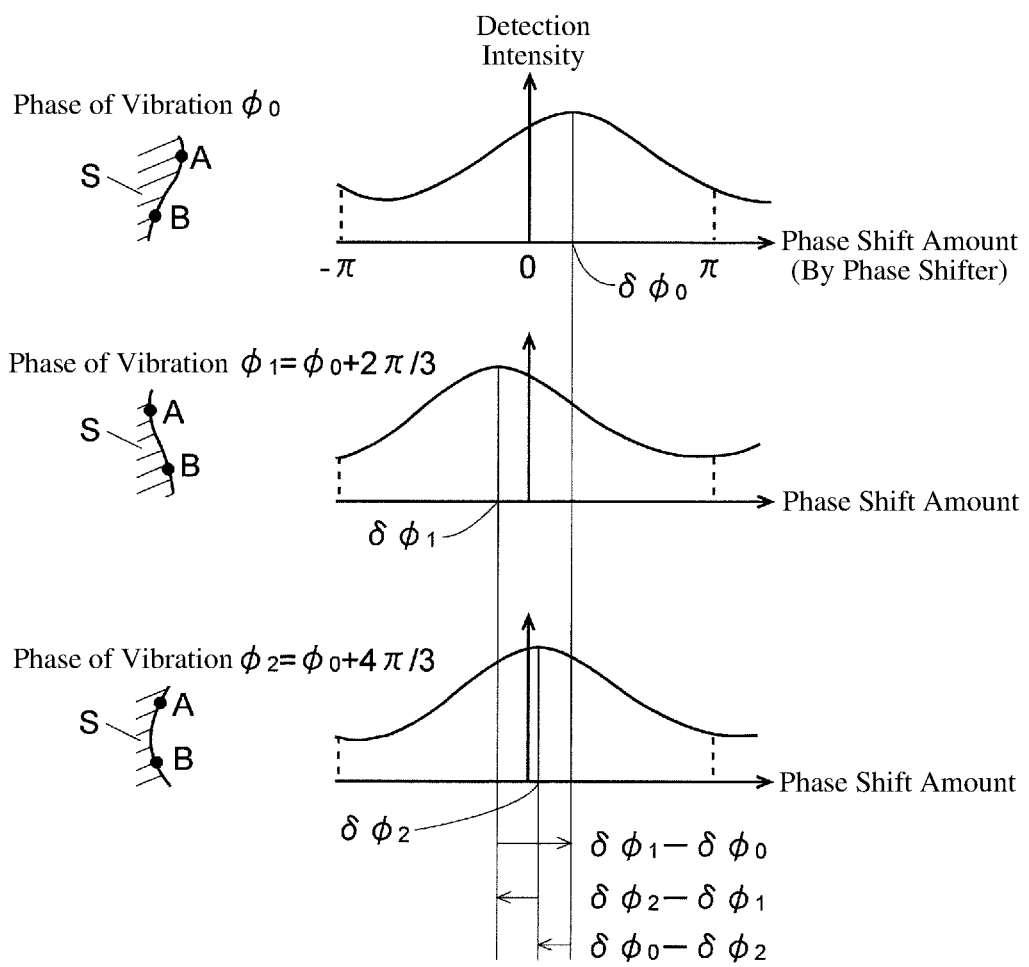
FIG. 3 is a graph for explaining the principle of the defect detection method of FIG. 2.

In the upper diagram in FIG. 3, an example is shown in which the shift amount of the phase by the phase shifter 153 and the intensity of the interference light detected by the detecting element of the image sensor 155, which are obtained when the phase of the vibration of the vibrator 12 is $\varphi_0$, are shown graphically. Note that, in FIG. 3, the relationship in which the detection intensity varies sinusoidally with respect to the phase shift amount is shown by a continuous curve. However, actually observed is discrete data, so the above-described continuous sine waveform reproduces by a least squares method or the like from the observed data. For this purpose, it is necessary to detect the intensities in at least three different phase shift amounts.

Subsequently, in Step S5, it is confirmed whether or not the value of k has reached $m_{max}$. Since it is still k=1 and has not yet reached $m_{max}$ (3 in this example), the determination in Step S5 is "NO". If "NO", the process proceeds to Step S6, and the value of k is incremented by 1 to set to "2" (the case where the determination in Step S5 is "YES" will be described later).

Next, the process returns to Step S3. At each timing when the phase $[\varphi_0+2\pi(k-1)/m_{max}]$ of the vibration of the vibrator 12 is k=2, i.e., $[\varphi_0+2\pi/3]\equiv\varphi_1$, the signal generator 11 transmits a pulse signal to the wavelength stabilized laser beam source 13, and the wavelength stabilized laser beam source 13 repeatedly emits illumination light which is a pulsed laser beam to the surface of the inspection target S at the timing when the pulse signal is received. Then, while changing (shifting) the phase of the illumination light reflected at the point A by the phase shifter 153 to at least three values, each detecting element of the image sensor 155 detects the intensity of the interference light of the illumination light reflected at the point A and passed through the phase shifter 153, etc., and the illumination light reflected at the point B (Step S4).

In the middle diagram in FIG. 3, the phase shift amount of the phase by the phase shifter 153 and the intensity of the interference light detected by the detecting element of the image sensor 155, which are obtained when the phase of the vibration of the vibrator 12 is $\varphi_1$, are shown graphically. Contrasting the middle diagram and the upper diagram in FIG. 3, the peak positions of the intensities of the interference light are shifted by $\delta\varphi_1-\delta\varphi_0$. This shift indicates that the phase difference between the optical path from the point A and the optical path from the point B changed due to the phase difference of the vibration of the vibrator 12 at the time of detection. The change in the phase difference of the optical path indicates that the relative displacement of the point A and the point B in the out-of-plane direction is changing.

Thus, after performing the operation of Step S4 at k=2, since it has not yet reached $m_{max}$ (=3) in Step S5, it is determined to be "NO", and the value of k is incremented by 1 in Step S6 to set to 3. Then, the process returns to Step S3. At the timing when the phase of the alternating electrical signal is k=3 at $[\varphi_0+2\pi(k-1)/m_{max}]$, i.e., $[\varphi_0+4\pi/3]\equiv\varphi_2$, the wavelength stabilized laser beam source 13 repeatedly emits the illumination light, which is a pulsed laser beam, to the surface of the inspection target S, and each detecting element of the image sensor 155 detects the strength of the interference light (Step S4). In this way, as shown in the lower diagram in FIG. 3, the relationship between the phase shift quantity by the phase shifter 153 and the intensity of the interference light when the phase of the alternating electrical signal is $\varphi_2$ is obtained.

Note that, as in the case of k=1, even when k=2 and 3, by using the wavelength stabilized laser beam source 13, it is possible to prevent shortening of the coherence length, which in turn can prevent the interference of both.

Thereafter, in Step S5, since the value of k is 3 and the value has reached $m_{max}$, it is determined as "YES", and the process proceeds to Step S7. In Step S7, the transmission of the alternating electrical signal from the signal generator 11 to the vibrator 12 is stopped. Thereby, the vibrator 12 stops the vibration.

Next, in Steps S8 and S9, the vibration state (the amplitude and the phase) of the elastic wave at each point in the measurement region is obtained by the following operations. First, for each detecting element of the image sensor, the maximum output phase shift amounts $\delta\varphi_0$, $\delta\varphi_1$, and $\delta\varphi_2$ in which the output of the detecting element maximizes while the phase shift amount by the phase shifter 153 is changed in the phases $\varphi_0$, $\varphi_1$, and $\varphi_2$ of each vibration are obtained (see the upper, middle, and lower diagrams in FIG. 3). Furthermore, the difference $(\delta\varphi_1-\delta\varphi_0)$, $(\delta\varphi_2-\delta\varphi_1)$, and $(\delta\varphi_0-\delta\varphi_2)$ between the maximum output phase shift amounts different in the phase shift of the vibration is obtained (Step S8). The difference between these three maximum output phase shift amounts shows three sets of relative displacements of the point A and the point B in the out-of-plane direction by two data different in the phase of the vibration of the vibrator 12 (i.e. different in time). Based on these three sets of relative displacements, three parameter values, i.e., the amplitude of vibration, the phase of vibration, and the center value of vibration (DC component), at each point in the measurement region are obtained (Step S9).

Based on the values of the amplitude and the phase at each point thus obtained, an image is generated (Step S10). For example, by configuring such that the larger the amplitude of the measurement point, the higher the brightness of the pixel corresponding to the measurement point, it is possible to express the difference in the amplitude of the vibration by the difference in the light and darkness of the image.

By performing the processing on the generated image using a known image processing technique, a defect D on the surface of the inspection target S is detected (Step S11). For example, a defect is detected where the brightness of the pixel changes suddenly with the movement of the position on the image. Note that instead of performing the image processing, the defect may be detected by visually viewing the image by an inspector. Alternatively, the defect in the measurement region may be detected by detecting, for example, a discontinuous point without generating an image. When the processing in Step S11 is completed, all Steps of the defect detecting method using the vibration measurement device 10 of the present embodiment are completed.

The present invention is not limited to the above-described embodiment. In the above-described example, although $m_{max}=3$, by selecting $m_{max}$ so as to be larger than the number represented by $[2n+1]$ (n is a natural number of 2 or more), it is possible to detect up to the $n^{th}$ component ($n^{th}$ harmonic component) of the elastic wave excited on the inspection target S. That is, since the relative displacement of the point A and the point B in the out-of-plane direction is obtained by $(2n+1)$ sets or more, $(2n+1)$ pieces of parameter values, i.e., the amplitude of the fundamental wave, the phase of the fundamental wave, the amplitude of the second harmonic, the phase of the second harmonic, . . . , the amplitude of the $n^{th}$ harmonic, the phase of the $n^{th}$ harmonic, and the DC component of the elastic wave, are obtained.

In the above-described embodiment, the wavelength stabilized laser beam source 13 for stabilizing the wavelength by performing feedback by a volume holographic grating is used. However, a wavelength stabilized laser having another grating may be used. Alternatively, a laser for stabilizing the wavelength by a technique other than feedback by a grating may be used. Such a laser is exemplified by a wavelength stabilized laser equipped with a mechanism for controlling the temperature of the semiconductor laser and a mechanism for detecting the wavelength of the oscillation laser beam generated by the semiconductor laser and configured to control the temperature of the semiconductor laser in accordance with the deviation of the wavelength of the oscillation laser beam from a predetermined wavelength.

In the above-described embodiment, the signal generator 11 and the vibrator 12 are connected by a cable (wired), and the signal generator 11 and the wavelength stabilized laser beam source 13 are connected by a cable (wired). However, these may be connected wirelessly. In particular, it is preferable that the signal generator 11 and the vibrator 12 be wirelessly connected. By wirelessly connecting the signal generator 11 and the vibrator 12, even if the vibrator 12 is in contact with the inspection target S and the component of the vibration measurement device 10 other than the vibrator 12 is arranged at a position away from the inspection target S, it is not necessary to prepare a long cable. Such a configuration using radio is useful when inspecting a large inspection target S, such as, e.g., an infrastructure structure of a bridge or the like.

In the above-described embodiment, the vibrator 12 configured to be used by bringing into contact with the surface of the inspection target S is used. However, in place of it, a speaker or the like placed at a position not in contact with the surface of the inspection target S may be used as the vibrator. This configuration is advantageous when an inspection target S is inspected at a position or a height at which it is difficult to bring the vibrator into contact with the surface.

Although the speckle-sharing interferometer 15 is used in the above-described embodiment, a speckle interferometer may be used instead.

DESCRIPTION OF SYMBOLS

10: Vibration measurement device
11: Signal generator
12: Vibrator
13: Wavelength stabilized laser beam source
14: Illumination light lens
15: Speckle-sharing interferometer
   151: Beam splitter
      1521: First reflecting mirror
      1522: Second reflecting mirror
   153: Phase shifter
   154: Condenser lens
155: Image sensor
16: Control unit
17: Storage unit

The invention claimed is:

1. A vibration measurement device comprising:
an excitation unit configured to excite an elastic wave to an inspection target;
an illumination unit configured to perform stroboscopic illumination to a measurement region of a surface of the inspection target using a wavelength stabilized laser beam source provided with a volume holographic grating, the volume holographic grating being configured to selectively return light of a narrower wavelength band than a wavelength band of an oscillation laser beam from a semiconductor laser to the semiconductor laser; and
a displacement measurement unit configured to collectively measure a displacement of each point of the measurement region in a back-and-forth direction by speckle sharing interferometry in at least three mutually different phases of the elastic wave by controlling a phase of the elastic wave and timing of the stroboscopic illumination,
wherein the displacement measurement unit is set such that an optical path difference between two light beams which are reflected from two points on the surface of the inspection target in the measurement region and interfere with each other by the speckle sharing interferometry is shorter than a coherence length of a laser beam output from the wavelength stabilized laser beam source over the entire measurement region.

2. The vibration measurement device as recited in claim 1,
wherein the displacement measurement unit detects $n^{th}$ harmonic components of the elastic wave from the displacement of each point in the measuring area in the back-and-forth direction, wherein the number of phase states in the at least three phases is equal to or greater than $(2n+1)$, and the number n is a natural number equal to or greater than 2.

* * * * *